United States Patent [19]
Hardwick et al.

[11] Patent Number: 6,093,905
[45] Date of Patent: Jul. 25, 2000

[54] PROCESS FOR OPERATING A PLASMA ARC TORCH

[75] Inventors: Steven F. Hardwick, John's Island; J. Travis Hardwick, Charleston, both of S.C.

[73] Assignee: Innerlogic, Inc., Charleston, S.C.

[21] Appl. No.: 09/416,304

[22] Filed: Oct. 12, 1999

[51] Int. Cl.$^7$ .................................................. B23K 10/00
[52] U.S. Cl. ........................ 219/121.59; 219/121.38; 219/121.55; 219/121.44
[58] Field of Search ...................... 219/121.51, 121.53, 219/121.54, 121.37, 121.38, 121.59, 121.57, 74, 75, 121.44

[56] References Cited

U.S. PATENT DOCUMENTS

| | | | |
|---|---|---|---|
| 5,414,237 | 5/1995 | Carkhuff | 219/121.51 |
| 5,614,110 | 3/1997 | Shintani et al. | 219/121.44 |
| 5,828,030 | 10/1998 | Naor | 219/121.55 |

*Primary Examiner*—Mark Paschall
*Attorney, Agent, or Firm*—Dority & Manning

[57] ABSTRACT

A process for operating a plasma torch on shut down to substantially increase electrode element life involves shutting down the plasma torch according to a first shut down mode for a first predetermined number of pierces attributed to the electrode element. The first shut down mode is controlled such that plasma gas flow through the swirl ring and nozzle decrease to zero substantially immediately upon termination of arc current to the electrode. The shut down method is switched to a second shut down mode for an additional second predetermined number of pierces. In the second shut down mode, the plasma gas flow through the swirl ring and nozzle are maintained after termination of the arc current to the electrode. The shut down mode may be switched back again to the first mode after the second predetermined number of pierces.

24 Claims, 4 Drawing Sheets

PROCESS FOR OPERATING A PLASMA ARC TORCH

BACKGROUND OF THE INVENTION

The present invention relates generally to a process for operating a plasma arc torch, and more particularly to a shut down process that significantly extends the life of the electrode and nozzle.

The operation of conventional plasma arc torches is well understood by those in the art. The basic components of these torches are a body, an electrode mounted in the body, a nozzle defining an orifice for a plasma arc, a source of ionizable gas, and an electrical supply for producing an arc in the gas. Upon start up, an electrical current is supplied to the electrode (generally a cathode) and the pilot arc is initiated in the ionizable gas typically between the electrode and the nozzle, the nozzle defining an anode. Then, a conductive flow of the ionized gas is generated from the electrode to the work piece, wherein the work piece then defines the anode, and a plasma arc is thus generated from the electrode the work piece. The ionizable gas can be non-reactive, such as nitrogen, or reactive, such as oxygen or air.

A significant problem with conventional plasma arc torches is wear of the electrodes and nozzles. Typically, the electrodes include a hafnium or a zirconium insert. These materials are desired for their material properties, but are extremely costly and require frequent replacement.

It has been found that a significant percentage of the electrode wear and damage actually occurs during shut down of the torch. It is believed that on cut off of electrical current to the electrode, wear results from a complicated interaction between molten surfaces of the electrode and the pressurized flow of the plasma gas through the nozzle. The phenomena is also described in U.S. Pat. No. 5,070,227.

It is also understood that the electrodes, and particularly the inserts, have a limited number of cycles or "pierces." A "pierce" refers to the starting up and initial cutting or piercing of the arc through a work piece. For each pierce there is obviously a prior shut down of the torch. Plasma torches utilizing conventional shut down methods have an electrode life of generally between about 1,000 to 1,500 pierces.

The industry is constantly seeking methods for improving the plasma torches, and particularly for extending the life and improving the wear characteristics of the electrodes. The present invention concerns just such an improved method.

OBJECTS AND SUMMARY OF THE INVENTION

It is therefore a principal object of the present invention to provide a process for operating a plasma arc torch, particularly on shut down, that significantly reduces wear on the electrode and minimizes damage to the nozzle.

An additional object of the present invention is to provide a process for shutting down conventional plasma arc torches that can be readily practiced by conventional torches with relatively minor modifications.

Additional objects and advantages of the invention will be set forth in part in the following description, or may be obvious from the description, or may be learned through practice of the invention.

In accordance with the objects and purposes of the invention, a process is provided for operating a plasma arc torch on shut down. The process operates on the principle of switching between different shut down modes in order to substantially increase the life of the electrode. It has been found by applicants that, through practice of the present invention, electrode life of conventional torches can be almost tripled.

In a preferred embodiment, the process comprises the steps of shutting down the plasma torch according to a first shut down mode for a first predetermined number of pierces attributed to the electrode. After the first predetermined number of pierces has been obtained, shut down is switched to a second mode for an additional second predetermined number of pierces. After this second predetermined number of pierces has been obtained, the shut down mode may be switched back to the first shut down mode.

In a preferred embodiment, the process further includes controlling the first shut down mode such that plasma gas flow through the swirl ring and nozzle decrease to substantially zero immediately after termination of arc current to the electrode. In other words, plasma gas flow through the swirl ring and nozzle are not purposefully sustained but are rapidly ramped or reduced to zero, for example by complete venting of the plasma gas. Typically, it will take about 20 milliseconds for the plasma gas to be completely vented.

In the second shut down mode, the plasma gas flow through the swirl ring and nozzle are purposefully sustained after termination of arc current for a predetermined period of time. Applicants have found that it is preferred that this time not exceed about two seconds.

In one preferred embodiment the first shut down mode, current to the electrode is ramped down from an operational value Io to a lesser intermediate value Im between times t1 and t2. Arc current is then shut off in a step function at time t2. Plasma gas flow through the swirl ring and the nozzle is ramped down from an operational value at time t1 to intermediate values at time t2. This ramping characteristic of the gas flow is a function of the vent rate of the plasma gas. Upon shutting off of the arc current at time t2, the plasma gas continues to vent and the gas flows through the swirl ring and nozzle decrease substantially immediately to zero. The intermediate value of the plasma gas flow through the nozzle at time t2 is preferably between about 40% to about 50% of its operational value at time t1. The intermediate value of the plasma gas flow through the swirl ring at time t2 is about 30% to about 40% of its operational value at time t1.

In an alternative preferred embodiment of the first shut down mode, pressure within the plasma gas chamber is controllably reduced between times t1 and t2 such that plasma gas flow through the nozzle is maintained at least at about its initial value.

It should be appreciated that any manner of shut down modes may be practiced as the first shut down mode according to the invention.

The second shut down mode is intended to remove or wear away the oxide layer that has built up on the electrode insert by continuing or sustaining plasma gas flow through the nozzle for a period of time after current to the electrode has been shut off. This sustained post flow mode will also wear away the electrode to a certain degree and thus should be limited to the number of pierces necessary to sufficiently remove enough of the built-up oxide layer to extend the life of the electrode insert.

The sustained post flow can be generated in the second shut down mode in various manners. In a preferred embodiment, the plasma gas is vented to a pressure source greater than atmospheric pressure in the second shut down mode, whereas in the first shut down mode the plasma gas is vented to atmospheric pressure. In this embodiment, it may also be preferred that arc current is ramped down in the second shut down mode from its operational value at a time t1 to an intermediate steady state value at a time t1' and held at the steady state value for a period of time until arc current is shut off at time t2. This intermediate steady state current permits the flow through the nozzle and flow through the swirl ring to steady out and reduce substantially uniformly. Once arc current is shut off at time t2, the flows are sustained for a period of time preferably not to exceed about two seconds. The flows are then terminated either by venting the plasma gas to atmosphere or simply shutting off the plasma gas flow.

The invention will be described in greater detail below through use of the appended figures.

DETAILED DESCRIPTION

Figure 1:
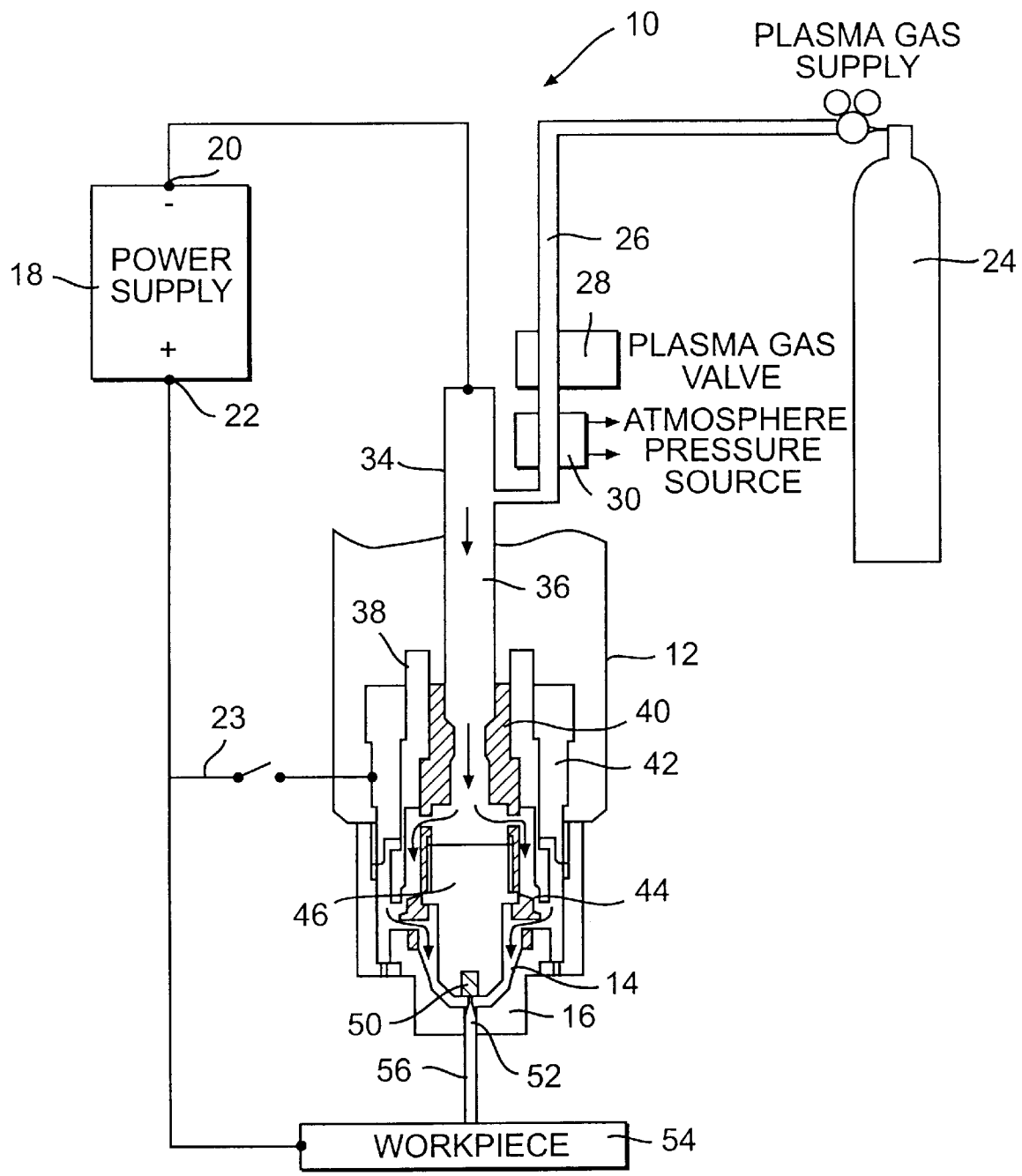
FIG. 1 is a simplified schematic view of a conventional plasma arc torch constructed to operate according to the present invention.

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment, can be used with another embodiment to yield still a further embodiment. It is intended that the present invention include such modifications and variations as come within the scope of the invention.

FIG. 1 is a simplified schematic view of a conventional plasma arc torch, similar to the FL 100 plasma arc torch provided by InnerLogic, Inc. of Charleston, S.C. It should be appreciated, however, that the present inventive method is not limited to any particular type of plasma arc torch and may be practiced by any manner of conventional torches. For example, U.S. Pat. No. 5,070,227 describes a control process applicable to a wide variety of torches, including torches sold by HyperTherm, Inc. of Hanover, N.H. The present control method is applicable to the types of torches described in the '227 patent and the '227 patent is incorporated herein by reference in its entirety for all purposes.

The operation of conventional torches is well understood by those skilled in the art and a detailed explanation thereof is not necessary for purposes of this disclosure. The following description is for background purposes relating to conventional plasma arc torches in general.

Referring to FIG. 1, plasma arc torch 10 has a basic body, generally indicated as 12. Body 12 includes a torch supply tube 34 defining a supply chamber 36 that is supplied with a source of pressurized ionizable gas from gas supply 24 through gas supply line 26. A remotely actuated valve, such as solenoid valve 28, is disposed in-line between supply tube 34 and gas source 24 to shut off the supply of gas to torch 10 upon actuation of the valve. As is appreciated by those skilled in the art, the plasma gas may be non-reactive, such as nitrogen, or reactive, such as oxygen or air. Torch body 12 includes an electrode body 46, typically formed from copper. An electrode insert or element 50 is fitted into the lower end of electrode body 46. Element 50 is typically formed of hafnium or zirconium, particularly when the plasma gas is a reactive gas.

An insulating body 38 generally surrounds the supply tube 34 and electrode body 46. The cathode body 40 is disposed generally surrounding supply tube 34 and an anode body 42 is disposed surrounding insulating body 38.

A nozzle 16 is disposed at the forward end of electrode body 46 and defines an arc passageway 52 aligned with electrode element 50.

A swirl ring 44 is disposed around the electrode body 46 and has holes defined therein to induce a swirling component to plasma gas entering the plasma gas chamber 14, as will be discussed in greater detail below.

A power supply 18 is provided to supply electrical current to electrode body 46 and the electrode element 50. A negative power lead 29 is in electrical communication with supply tube 24 and cathode body 40. In a pilot arc mode, a positive power lead 22 is in electrical communication with anode body 42 through switch 23. Insulating body 38 electrically isolates anode body 42 from cathode body 40. Positive power lead 22 is also connectable to a work piece 54 that is to be cut or pierced by the plasma torch once switch 23 is opened. Power supply 18 may constitute any conventional dc power supply sufficient to provide current to the torch at an appropriate voltage to initiate the pilot arc and then maintain the arc in the operational cutting mode of the torch.

In operation, plasma gas flows from source 24, through supply line 26 and shut off valve 28 and a vent valve 30 into chamber 36 of supply tube 34, as generally indicated by the arrows in FIG. 1. The plasma gas flows downward in chamber 36 through orifices in the cathode body and orifices in swirl ring 44 before entering the lower plasma gas chamber 14. It should be understood that lower plasma gas chamber 14 is in communication with the entirety of the supply chamber 36 of supply tube 34 so that a change in pressure anywhere within the system will affect a change in pressure within lower plasma gas chamber 14.

In the pilot arc mode of torch 10, switch 23 is closed so that the positive lead is connected to anode body 42. Power supply 20 provides current at the appropriate voltage to initiate the pilot arc between electrode element 50 and nozzle 16. A desired plasma gas flow and pressure are set by the operator for initiating the pilot arc. The pilot arc is started by a spark or other means, such as a contact starting technique, all of which are known in the art.

The plasma gas flow during the pilot arc mode is from supply 24, through supply line 26 and valves 28,30 into supply chamber 34, through orifices in cathode body 40, through the holes in swirl ring 44, into lower plasma chamber 14, and out through arc passageway 52 of nozzle 16. The swirling flow generated by swirl ring 44 is desired as a means for stabilizing the arc in the operational cutting mode so that the arc does not impinge on and damage the nozzle.

In order to transfer torch 10 to the cutting mode, the torch is brought close to workpiece 54 so that the arc transfers to the workpiece 54 as switch 23 opens. Positive power is then fed only to workpiece 54. The current is increased to a desired level for cutting such that a plasma arc 56 is generated which extends through arc passageway 52 to workpiece 54. The operational current levels depend on the type of torch and application desired, and typically range from about 20 to about 200 amps. As the operational current is increased, the plasma gas within lower plasma chamber 14 heats up and a decrease in plasma gas flow out of nozzle 16 results. In order to sustain sufficient plasma gas flow through nozzle 16 to sustain the plasma arc 56, pressure of the plasma gas being supplied must be increased with the increase of current.

The shut down process according to the present invention will now be described in greater detail through use of the diagrams of FIGS. 2–4.

As already described, a critical concern with conventional plasma arc torches is the electrode life, and particularly the life of the hafnium or zirconium inserts. It is known that the starting and shut off process results in severe wear of the electrode elements. The present applicants have discovered that the electrode life can be substantially lengthened if the shut down process is monitored and controlled so as to switch from a first shut down method wherein there is no sustained post-flow of plasma gas through the nozzle to a second shut down method wherein post-flow of plasma gas through the nozzle is sustained for a desired period of time. Although not wishing to be bound by any particular theory, applicants believe that at least one of the factors contributing to wear on the electrode elements is the build up of an oxide layer on the elements. It is believed that the sustained post flow in the second shut down mode removes a substantial portion of the oxide layer. The post flow may also remove a portion of the electrode element material as well and, thus, the number of pierces in the second shut down mode should be limited to only the number necessary to remove a substantial portion of the oxide layer before switching back to the first shut down mode.

On tests conducted on a FL 100 plasma arc torch using just the no post-flow first shut down mode, the electrode life was about 1,200 pierces. The same model torch was tested according to the shut down method of the present invention wherein the shut down process was switched from a first shut down mode to a post-flow second shut down mode for a predetermined number of pierces and the electrode life was extended to about 3,400 pierces. It is believed that this substantial increase in the electrode life was due to the fact that the sustained post-flow in the second shut down mode abraded or removed a substantial portion of the oxide layer that had built up on the electrode element.

The ratio of pierces in the second shut down mode as compared to the first shut down mode can be determined empirically and then stored in a control system for the torch. The system then merely counts the number of pierces and switches the mode of shut down operation accordingly. For the FL 100 plasma torch tested, applicants found that the torch can be shut down in the first shut down mode for about 900 to 1,000 pierces, and then switched to the second shut down mode for about 100 pierces. After the 100 pierces in the second shut down mode, control is switched back to the first shut down mode. The control should not be switched to the second shut down mode prior to a significant oxide layer building on the electrode element because the post-flow in the second shut down mode would tend to remove more of the valuable element material than oxide material. For example, applicants have found that switching from the first shut down mode to the second shut down mode after ten pierces for only one pierce in the second mode does not substantially extend the life of the electrode, and may actually result in a decreased life. It should be appreciated by those skilled in the art that the particular number of pierces for the first and second modes will depend on the particular type of torch, insert material, current levels, etc. The best combination or ratio of pierces may be empirically determined or estimated.

Figure 2:
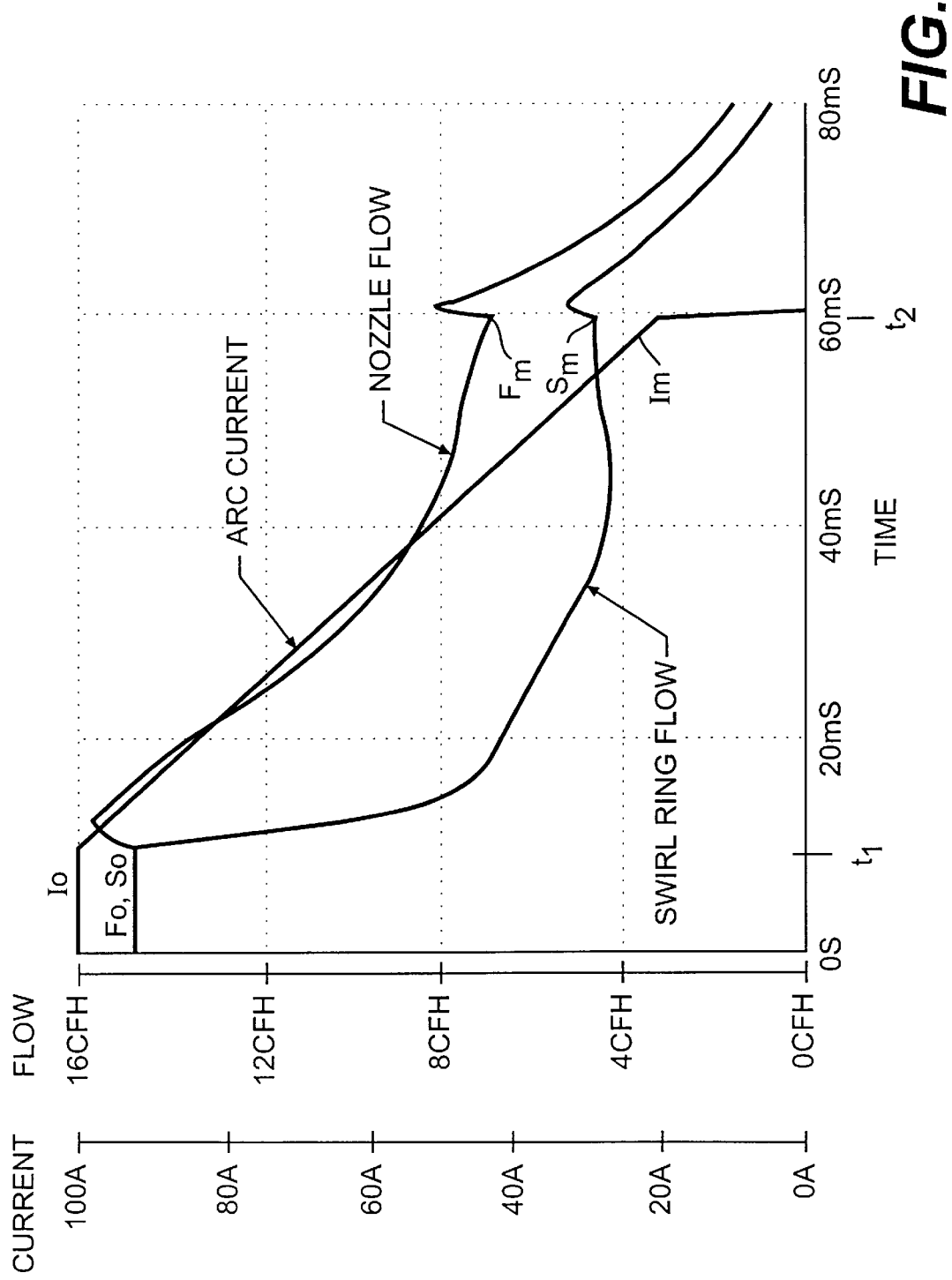
FIG. 2 is a graph illustrating an embodiment of the first shut down mode according to the invention.

FIG. 2 represents a conceptual timing phase of one embodiment of the first shut down mode according to the invention. The arc current is shown at its operational level Io, and nozzle flow and swirl ring flow are shown at their operational levels Fo, So respectively. The shut down process is initiated at time t1 wherein plasma arc current is reduced, for example by being ramped down, to an intermediate value Im between times t1 and t2. This ramping down or decrease of the plasma arc current will cause the plasma arc 56 generated at electrode element 50 to correspondingly decrease in its effective diameter. It is believed that this corresponding decrease in the size of the plasma arc will permit any molten material at the electrode insert 50 to harden or solidify around its circumference as the plasma arc diminishes in size. Applicants believe that this hardening or solidification of the material also results in an oxide layer building up on the insert. It is also believed that the molten material is not substantially worn away in this process by the plasma gas flow through the nozzle since the flow is not substantial enough to degrade the molten material as it is solidifying.

In the non-sustained post-flow shut down mode illustrated in FIG. 2, vent valve 30 is actuated at time t1 so as to vent the plasma gas to atmosphere. Plasma gas valve 28 may also be simultaneously shut off. Thus, at time t2, plasma gas flow through the nozzle and through the swirl ring are allowed to ramp down to zero after spiking upon current shut off. It is desired that, in this first shut down mode, the flows ramp substantially immediately to zero after time t2 when current is shut off to the electrode element. Referring to FIG. 2, it takes about 20 milliseconds for the flows to reduce to substantially no flow. It should be appreciated that "substantially immediately" refers to the flows (non-sustained) reaching a zero state as soon as possible after time t2. With conventional torches, this time may vary but is generally around 20 milliseconds.

As the size of the plasma arc diminishes with current ramp down starting at time t1, the effective path or opening through the nozzle becomes increasingly larger so that the plasma gas remaining in the gas chamber tends to escape or vent through the nozzle at an increasingly faster rate. Accordingly, plasma gas flow rate through the nozzle has a significant increase just after time t1 when the plasma gas valve is shut or the plasma gas is vented through the vent valve. Vent valve 30 is generally opened simultaneously with the closing of solenoid shut off valve 28 and vents the plasma gas flow to atmosphere upstream of the plasma gas chamber 14. By venting the gas supply at time t1, the differential pressure across swirl ring 44 is greatly reduced and swirl ring flow decreases markedly at time t1, as reflected in FIG. 2. The swirl flow reduces to an intermediate value Sm at about time t2. Likewise, nozzle flow also reduces to an intermediate value Fm at time t2.

At time t2, electrode current has been reduced to its intermediate value level Im. At time t2, current to the electrode is completely shut off in a step function and any remaining arc will immediately extinguish. Pressure within gas chamber 14 will also decrease accordingly to zero and plasma gas flow rate to the nozzle and swirl rate flow through the swirl ring will jump once the plasma arc is extinguished and then will subsequently immediately decrease to zero, as discussed above.

The first mode of the shut down process according to the invention illustrated in FIG. 2 is but one preferred embodiment of a suitable non-sustained post-flow shut down. Other non-sustained post-flow shut downs may also be utilized as the first shut down mode of the present invention. For example, our co-pending U.S. patent application Ser. No. 09/178,206 filed on Oct. 23, 1998, describes another shut down process that may be utilized as the first shut down mode of the present invention. In this regard, our co-pending '206 application is incorporated herein by reference in its entirety for all purposes.

Figure 4:
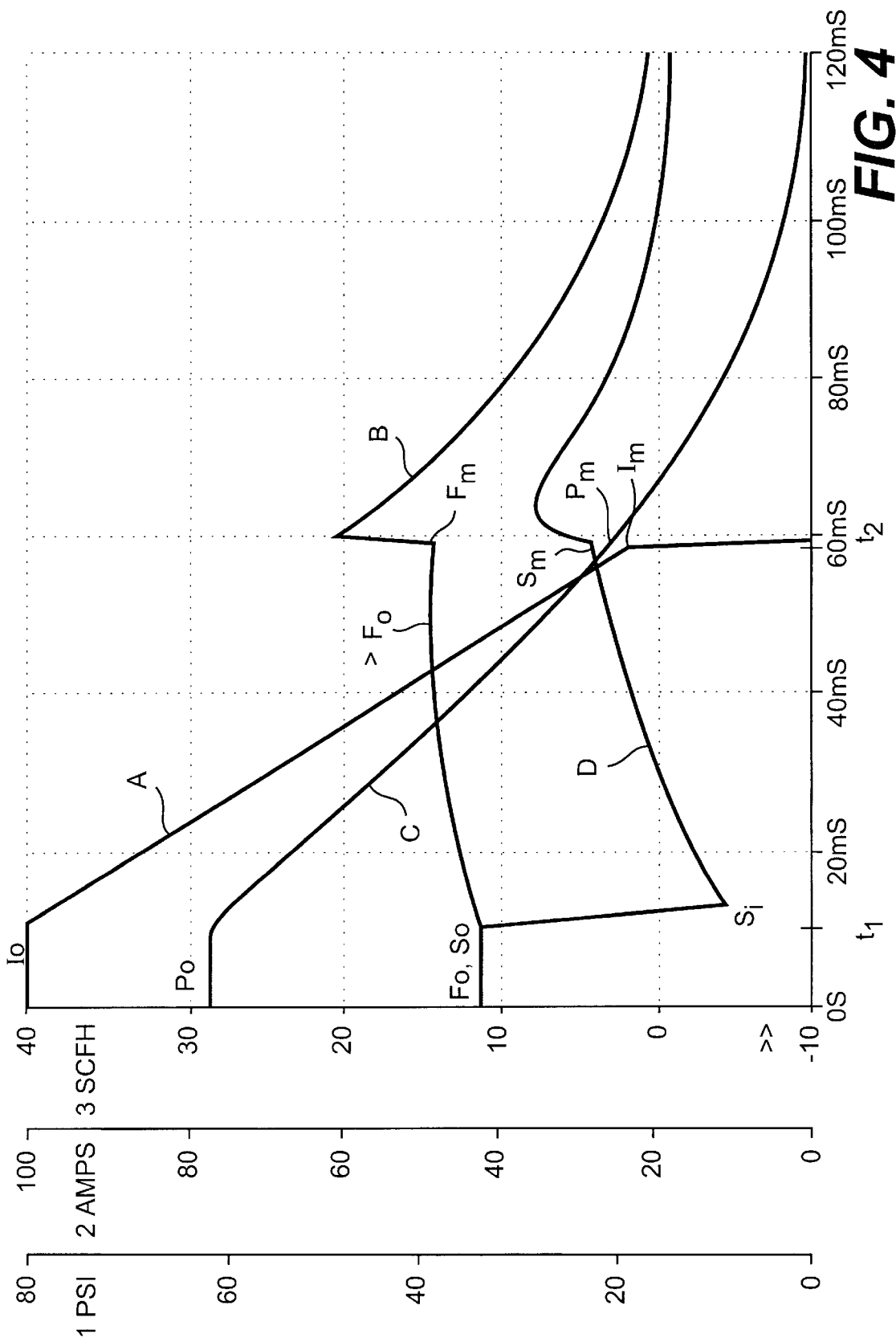
FIG. 4 is a graph particularly illustrating an alternative first shut down mode according to the invention.

FIG. 4 is graph from our co-pending '206 application. In this embodiment, venting of the plasma gas chamber through vent valve 30 is precisely controlled as a function of the orifice size in the vent valve so that the differential pressure across the swirl ring 44 is actually briefly reversed immediately after time t1. This has the effect of essentially dampening what would be a sudden release or escape of the plasma gas from the gas chamber as arc 56 diminishes between times t1 and t2. Thus, referring to FIG. 4, it can be seen that plasma flow through the nozzle is maintained at its operational value Fo or slightly greater between times t1 and t2. The nozzle flow profile would approach that of FIG. 2 with increased venting through the vent valve. Swirl flow will increase by the time t2 is reached and will preferably be at least about 30% of its operational value at time t2. Likewise, plasma gas flow through the nozzle will also tend to flatten out as time t2 is approached. At time t2 when arc current is shut off, plasma flow through the nozzle and through the swirl ring will substantially immediately ramp down to zero. In this embodiment as illustrated in FIG. 4, the flow will take slightly longer to reach a zero level due to the fact that the vent path through the vent valve is more restricted than in the embodiment of FIG. 2. However, post-flow is not sustained after time t2.

Referring again to FIG. 2, applicants have found that it is preferred for gas flow through the nozzle at time t2 to be between about 40% to about 50% of its operational value at time t1. Likewise, plasma gas flow through the swirl ring at time t2 is about 30% to about 40% of its operational value at time t1.

As discussed above, the torch is shut down according to the first shut down mode for a predetermined number of pierces. These pierces may be automatically counted by the control system so that switch over to the second shut down mode is accomplished without operator interface. Preferably, the second shut down mode involves a post-flow shut down wherein flow rate through the nozzle is sustained for a period of time after arc current shut down. Applicants have determined that, at least for the FL 100 plasma arc torch, this post flow should not exceed about two seconds.

Figure 3:
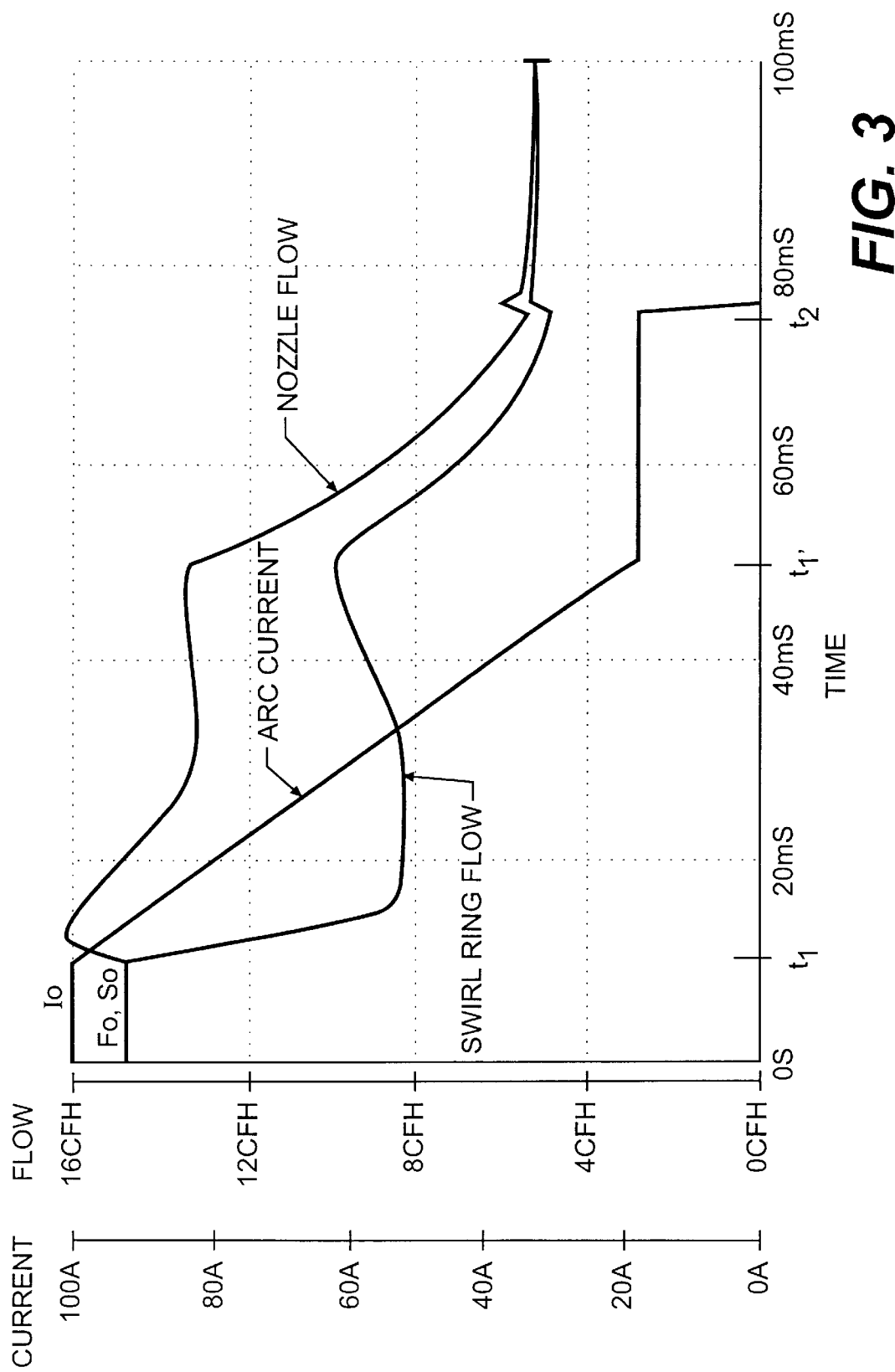
FIG. 3 is a graph illustrating an embodiment of the second shut down mode according to the invention.

A preferred mode of the second shut down is illustrated in FIG. 3. At time t1, arc current is ramped down to a steady state intermediate level at time t1'. Arc current is sustained at this intermediate steady state level between times t1' and t2. At time t2, arc current is shut off. Also at time t1, vent valve 30 is opened but in this configuration vents the plasma gas not to atmosphere, but to a pressure source greater than atmospheric pressure. Applicants have found that a suitable pressure source is maintained at about 7.5 psi. This pressure source may be a secondary plasma gas supply maintained at the desired pressure, for example at 7.5 psi. By venting the plasma gas flow to a pressure source greater than atmospheric, plasma flow through the nozzle and swirl ring will reach a steady state level greater than zero even after time t2 so long as plasma gas valve 28 is open. Arc current is maintained at its intermediate steady state value between times t1' and t2 so that the plasma gas flow through the nozzle and swirl ring will settle out and reach a generally uniform ramp down profile between times t1' and t2. At time t2, arc current is shut off but gas valve 28 remains open for the desired time of the post flow, for example up to about two seconds. After the post flow period, valve 28 is shut and the nozzle flow and swirling flow will ramp immediately to zero.

It should be appreciated that the post flow process described relating to FIG. 3 is but one of any number of post flow variations that may be utilized as the second flow mode in the present invention. All such modes are within the scope and spirit of the invention.

The plasma arc torch is shut down according to the second mode for a second predetermined number of pierces, as discussed above. After the second predetermined number of pierces have been achieved, the control system may automatically switch the shut down mode back to the first mode.

It should be appreciated by those skilled in the art that there are a number of variations and modifications that may be made in the shut down process according to the present invention. For example, a number of post flow and no post-flow shutdown methods may be utilized as the first and second shutdown modes according to the invention. It is intended that the present invention include such modifications and variations as come within the scope and spirit of the appended claims and their equivalents.

What is claimed:

1. A process for operating a plasma torch on shut down, the plasma torch having a plasma gas chamber supplied with a plasma gas, an electrode supplied with current for generating a plasma cutting arc by ionization of the plasma gas, and a nozzle disposed in front of the electrode through which the plasma cutting arc extends to a workpiece, in an operational cutting mode of the torch the plasma gas within the plasma gas chamber having a swirl component imparted thereto by a swirl ring, said process comprising:

shutting down the plasma torch according to a first shutdown mode for a first predetermined number of pierces attributed to the electrode;

controlling the first shutdown mode such that plasma gas flow through the swirl ring and nozzle decrease to zero substantially immediately after termination of arc current to the electrode;

after the first predetermined number of pierces, switching to a second shutdown mode for an additional second predetermined number of pierces; and controlling the second shutdown mode such that plasma gas flow through the swirl ring and nozzle are sustained after termination of arc current to the electrode.

2. The process as in claim 1, wherein in the first shutdown mode, current to the electrode is ramped down from an operational value Io to a lesser intermediate value Im between times t1 and t2 and then shut off in a step function at time t2, and plasma gas flow through the swirl ring and nozzle is ramped down from operational values at time t1 to intermediate values at time t2, and then allowed to decrease to zero immediately upon shutting off arc current at time t2.

3. The process as in claim 2, wherein the intermediate value of plasma gas flow through the nozzle at time t2 is about 40% to about 50% of its operational value at time t1, and the intermediate value of plasma gas flow through the swirl ring at time t2 is about 30% to about 40% of its operation value at time t1.

4. The process as in claim 3, wherein the plasma gas flow through the swirl ring and nozzle are ramped down by venting of the plasma gas to atmosphere.

5. The process as in claim 1, wherein in the first shutdown mode, plasma gas flow through the swirl ring and nozzle drop off to zero in about 20 milliseconds after current cut off at time t2.

6. The process as in claim 1, wherein in the first shutdown mode, pressure within the plasma gas chamber is controllably reduced between times t1 and t2 such that plasma gas flow through the nozzle is maintained at least at about its initial value between times t1 and t2.

7. The process as in claim 1, wherein in the first shutdown mode plasma gas is vented to atmospheric pressure between times t1 and t2, and in said second shutdown mode, plasma gas is vented to a pressure source greater than atmospheric pressure from time t1 to up to about 2 seconds after current shut off.

8. The process as in claim 7, wherein in said second shutdown mode, arc current in ramped down from its operational value Io at time t1 to an intermediate steady state value at a time t1' and held at the steady state value between times t1' and current cut off at time t2.

9. The process as in claim 1, wherein said switching between the first and second shutdown modes is controlled by a control system associated with the plasma torch.

10. The process as in claim 9, wherein said control system counts the number of pierces of the torch and automatically switches shutdown modes the second shutdown mode after the first predetermined number of pierces, and automatically switches back to the first shutdown mode after the second predetermined number of pierces.

11. The process as in claim 10, wherein the first and second predetermined number of pierces are determined empirically and stored in the control system.

12. The process as in claim 1, wherein in the second shutdown mode, plasma gas flow through the swirl ring and nozzle are maintained for no more than about 2 seconds.

13. A process for operating a plasma torch on shut down, the plasma torch having a plasma gas chamber supplied with a plasma gas, an electrode supplied with current for generating a plasma cutting arc by ionization of the plasma gas, and a nozzle disposed in front of the electrode through which the plasma cutting arc extends to a workpiece, in an operational cutting mode of the torch the plasma gas within the plasma gas chamber having a swirl component imparted thereto by a swirl ring, said process comprising:

shutting down the plasma torch according to a first shutdown mode for a first predetermined number of pierces attributed to the electrode; and after the first predetermined number of pierces, switching to a second shutdown mode for an additional second predetermined number of pierces.

14. The process as in claim 13, further comprising controlling the first shutdown mode such that plasma gas flow through the swirl ring and nozzle decrease to zero substantially immediately after termination of arc current to the electrode, and controlling the second shutdown mode such that plasma gas flow through the swirl ring and nozzle are maintained after termination of arc current for up to no more than about 2 seconds.

15. The process as in claim 13, wherein in the first shutdown mode, current to the electrode is ramped down from an operational value Io at a time t1 to a lesser intermediate value Im at a time t2 and then shut off in a step function at time t2, and plasma gas flow through the swirl ring and nozzle is ramped down from operational values at time t1 to intermediate values at time t2, and then allowed to decrease to zero immediately upon shutting off arc current at time t2.

16. The process as in claim 15, wherein the intermediate value of plasma gas flow through the nozzle at time t2 is about 40% to about 50% of its operational value at time t1, and the intermediate value of plasma gas flow through the swirly ring at time t2 is about 30% to about 40% of its operation value at time t1.

17. The process as in claim 15, wherein the plasma gas flow through the swirl ring and nozzle are ramped down by venting of the plasma gas to atmosphere.

18. The process as in claim 13, wherein in the first shutdown mode, plasma gas flow through the swirl ring and nozzle drop off to zero in about 20 milliseconds after current to the electrode is cut off.

19. The process as in claim 13, wherein in the first shutdown mode, arc current is ramped down from at operational value Io at a time t1 to a time t2 and then cut off at time t2, and pressure within the plasma gas chamber is controllably reduced such that plasma gas flow through the nozzle is maintained at least at about its operational value between times t1 and t2.

20. The process as in claim 13, wherein in the first shutdown mode plasma gas is vented to atmospheric pressure as arc current is ramped down from an operational value Io at a time t1 to an intermediate value at a time t2, and in said second shutdown mode, plasma gas is vented to a pressure source greater than atmospheric pressure from time t1 to up to about 2 seconds after current shut off.

21. The process as in claim 20, wherein in said second shutdown mode, arc current in ramped down from its operational value Io at time t1 to an intermediate steady state value at a time t1' and held at the steady state value between times t1' and current cut off at time t2.

22. The process as in claim 13, wherein said switching between the first and second shutdown modes is controlled by a control system associated with the plasma torch.

23. The process as in claim 23, wherein said control system counts the number of pierces of the torch and automatically switches shutdown modes the second shutdown mode after the first predetermined number of pierces, and automatically switches back to the first shutdown mode after the second predetermined number of pierces.

24. The process as in claim 23, wherein the first and second predetermined number of pierces are determined empirically and stored in the control system.

* * * * *